United States Patent
Zheng et al.

(10) Patent No.: US 10,139,657 B2
(45) Date of Patent: Nov. 27, 2018

(54) TRANSFER PLATE

(71) Applicants: BOE TECHNOLOGY GROUP CO., LTD., Beijing (CN); HEFEI BOE OPTOELECTRONICS TECHNOLOGY CO., LTD., Hefei, Anhui (CN)

(72) Inventors: Xianfeng Zheng, Beijing (CN); Sangwoog Kim, Beijing (CN); Jianzheng Zhang, Beijing (CN); Jinyan Cheng, Beijing (CN)

(73) Assignees: BOE TECHNOLOGY GROUP CO., LTD. (CN); HEFEI BOE OPTOELECTRONICS TECHNOLOGY CO., LTD. (CN)

( * ) Notice: Subject to any disclaimer, the term of this patent is extended or adjusted under 35 U.S.C. 154(b) by 587 days.

(21) Appl. No.: 14/801,890

(22) Filed: Jul. 17, 2015

(65) Prior Publication Data
US 2016/0144394 A1    May 26, 2016

(30) Foreign Application Priority Data
Nov. 21, 2014    (CN) .......................... 2014 1 0673638

(51) Int. Cl.
*G02F 1/13*    (2006.01)
*G02F 1/1337*    (2006.01)

(52) U.S. Cl.
CPC .......... *G02F 1/1303* (2013.01); *G02F 1/1337* (2013.01); *G02F 1/133784* (2013.01)

(58) Field of Classification Search
CPC ................................ G02F 1/1303; B05C 1/00
See application file for complete search history.

(56) References Cited

U.S. PATENT DOCUMENTS

| 6,169,592 B1 | 1/2001 | Choi |
| 2004/0038010 A1* | 2/2004 | Kim ................ G02F 1/133784 |
| | | 428/195.1 |

FOREIGN PATENT DOCUMENTS

| CN | 1495491 A | 5/2004 |
| CN | 101441367 A | 5/2009 |
| JP | H06-214377 A | 8/1994 |
| JP | 2000-338491 A | 12/2000 |
| KR | 20080057784 A | * 6/2008 |
| KR | 101394571 B1 | 5/2014 |

OTHER PUBLICATIONS

Office Action in Chinese Patent Application No. 201410673638.1, dated Sep. 6, 2016.

* cited by examiner

*Primary Examiner* — Sophie Hon
(74) *Attorney, Agent, or Firm* — Brooks Kushman P.C.

(57) ABSTRACT

The present disclosure provides a transfer plate. The transfer plate includes a base film, and a dot array arranged on the base film and consisting of a plurality of dots. The base film includes an active region corresponding to a display region and a non-active region surrounding the active region. The dot array at the active region is of a first dot angle, and the dot array at the non-active region is of a second dot angle less than the first dot angle.

20 Claims, 3 Drawing Sheets

- PRIOR ART -

- PRIOR ART -

- PRIOR ART -

- PRIOR ART -

TRANSFER PLATE

CROSS-REFERENCE TO RELATED APPLICATION

The present application claims a priority of the Chinese patent application No. 201410673638.1 filed on Nov. 21, 2014, which is incorporated herein by reference in its entirety.

TECHNICAL FIELD

The present disclosure relates to the field of display technology, in particular to a transfer plate.

BACKGROUND

During the manufacture of a thin film transistor liquid crystal display (TFT-LCD), it is required to apply a uniform alignment film made of an aligning agent onto a glass substrate of a liquid crystal cell, so as to align liquid crystal molecules thereon in a certain direction and deflect the liquid crystal molecules in a prescribed direction under the control of an electric field, thereby to achieve normal display of the liquid crystal display panel including the liquid crystal cell.

FIG. 1 shows a procedure of forming the alignment film on the glass substrate. At first, an aligning agent 101 is dripped by a dispenser 102 onto a place where an anilox roller 103 is in contact with a scraper 104, and coated uniformly onto the anilox roller 103 by the scraper 104. Then, the anilox roller 103 is in contact with a printing roller 106 having a transfer plate 105 with a predetermined pattern, so as to transfer the aligning agent 101 onto the transfer plate 105. Finally, the aligning agent 101 is printed by the transfer plate 105 onto a surface of a glass substrate 108 on a table 107 to form the alignment film. As shown in FIG. 2, the transfer plate 105 includes a base film 109 and a plurality of dots 110 arranged on the base film 109 at an identical density and an identical size. The amount of the aligning agent 101 adsorbed between the dots 110 is the same.

During the actual production, due to limitations of a transferring technique adopted by the transfer plate, the aligning agent 101 will flow in a printing direction and be spread from the center to the edge when it is printed onto the glass substrate 108. When the aligning agent 101 at the edge of the transfer plate is in an oversaturation state and printed onto a periphery of a display region of the glass substrate 108, a halo region will occur due to a resultant over-thick edge of the alignment film, and thereby the alignment film will be of a non-uniform thickness.

As shown in FIG. 3, a convex part of the alignment film 111 on the glass substrate 108 is just a halo region 112. FIG. 4 is a top view of a liquid crystal display panel including the halo region 112, where 113 represents a display region. When there is the halo region 112 at the display region of the liquid crystal display panel, non-uniform rubbing alignment will occur, and thereby the liquid crystal molecules will be aligned abnormally.

SUMMARY

An object of the present disclosure is to provide a transfer plate, so as to prevent an alignment film printed by an existing transfer plate from being of a non-uniform thickness, thereby to prevent liquid crystal molecules from being aligned abnormally due to the subsequent non-uniform rubbing alignment.

The present disclosure provides in one embodiment a transfer plate, including a base film, and a dot array arranged on the base film and consisting of a plurality of dots. The base film includes an active region corresponding to a display region and a non-active region surrounding the active region. The dot array at the active region is of a first dot angle, and the dot array at the non-active region is of a second dot angle less than the first dot angle.

In this embodiment, the dot angle of the dot array at the non-active region of the transfer plate is less than that of the dot array at the active region, so it is able to reduce an average height of a halo region at an edge portion of an alignment film when the alignment film is printed by the transfer plate, thereby to perform the subsequent rubbing alignment in a more uniform manner, and prevent the occurrence of abnormal alignment of liquid crystal molecules.

Alternatively, the first dot angle is within a range from 0° to 90°, and the second dot angle is within a range from 0° to 75°.

Alternatively, the first dot angle is 75°, and the second dot angle is 45°. In this embodiment, the dot angle of the dot array at the non-active region of the transfer plate is changed relative to the dot angle of the dot array at the active region, so as to print the edge portion of the alignment film at the smaller second dot angle, thereby to reduce a change in the thickness of the edge portion of the alignment film, and reduce an average height and a width of the halo region at the edge portion of the alignment film.

Alternatively, the dot array at the active region is of a first aperture ratio, and the dot array at the non-active region is of a second aperture ratio greater than the first aperture ratio.

Alternatively, the first aperture ratio is 25-40%, and the second aperture ratio is 30-45%.

Alternatively, the first aperture ratio is 30%, and the second aperture ratio is 35%. In this embodiment, the second aperture ratio is greater than the first aperture ration, so it is able to decrease a gap between the dots at the non-active region, thereby to decrease a total amount of the aligning agent at the non-active region and reduce the change in the thickness of the edge portion of the alignment film during the printing due to the insufficient aligning agent.

Alternatively, the dots of the dot array are distributed at an identical density at both the active region and the non-active region. In this embodiment, the dots are distributed at an identical density on the transfer plate, so as to print the alignment film uniformly.

Alternatively, the dots of the dot array are of an identical shape at both the active region and the non-active region. In this embodiment, the dots on the transfer plate are of an identical shape, so as to print the alignment film uniformly.

Alternatively, the dots of the dot array at the active region and the non-active region are each of a square or round shape.

Alternatively, a cross section of the non-active region is of a minimum width of 300 μm. In this embodiment, the dot angle of the dot array at the non-active region is less than that of the dot array at the active region, so as to reduce the height and the width of the halo region of the alignment film at the non-active region, thereby to facilitate the rubbing alignment and the manufacture of a narrow-bezel display panel.

DETAILED DESCRIPTION

In order to make the objects, the technical solutions and the advantages of the present disclosure more apparent, the present disclosure will be described hereinafter in a clear and complete manner in conjunction with the drawings and embodiments. Obviously, the following embodiments are merely a part of, rather than all of, the embodiments of the present disclosure, and based on these embodiments, a person skilled in the art may obtain the other embodiments, which also fall within the scope of the present disclosure.

Unless otherwise defined, any technical or scientific term used herein shall have the common meaning understood by a person of ordinary skills. Such words as "first" and "second" used in the specification and claims are merely used to differentiate different components rather than to represent any order, number or importance. Similarly, such words as "one" or "one of" are merely used to represent the existence of at least one member, rather than to limit the number thereof. Such words as "connect" or "connected to" may include electrical connection, direct or indirect, rather than to be limited to physical or mechanical connection. Such words as "on", "under", "left" and "right" are merely used to represent relative position relationship, and when an absolute position of the object is changed, the relative position relationship will be changed too.

Figure 1:
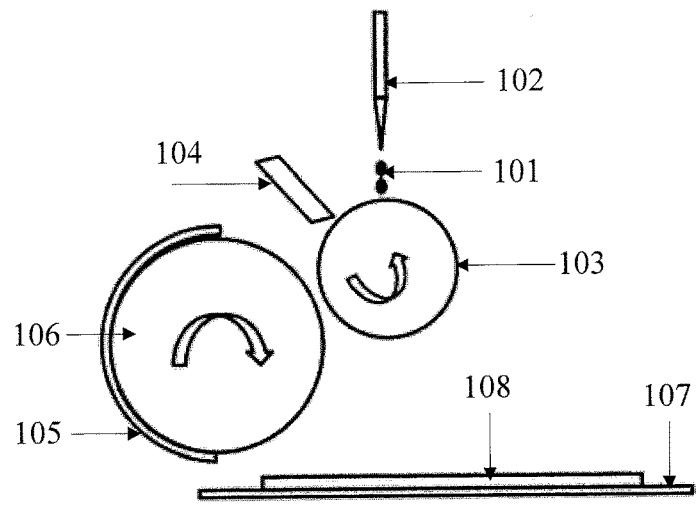
FIG. 1 is a schematic view showing a procedure of forming an alignment film on a glass substrate in the related art.
Figure 2:
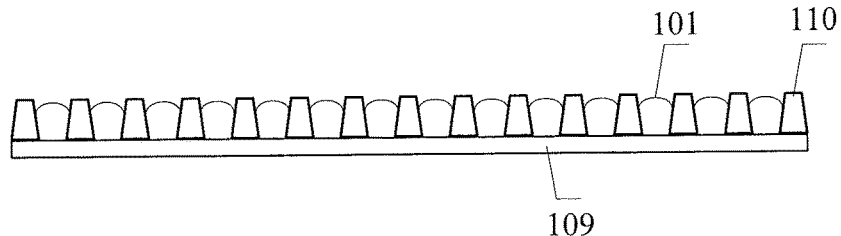
FIG. 2 is a schematic view showing an existing transfer plate.
Figure 3:
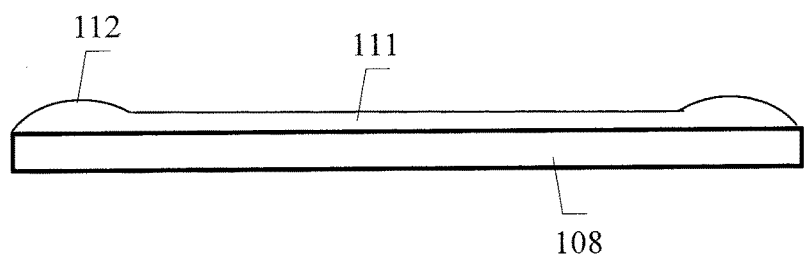
FIG. 3 is a schematic view showing the existing alignment film formed on the glass substrate.
Figure 4:
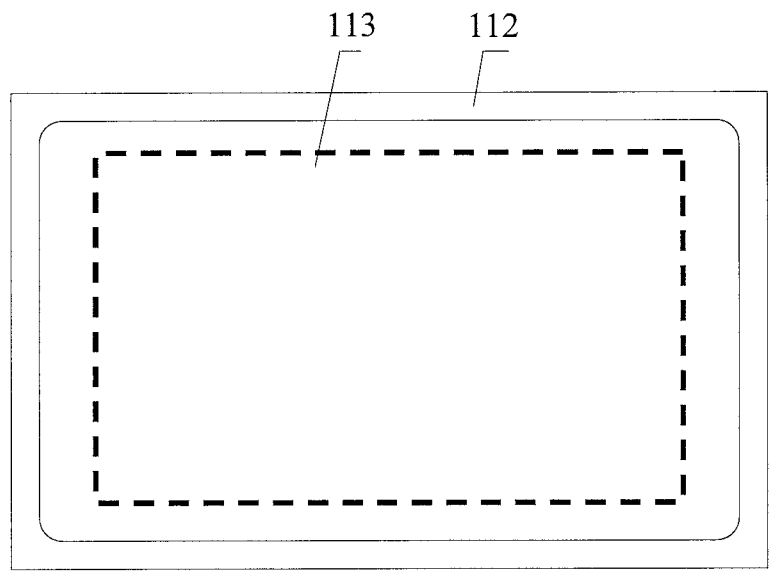
FIG. 4 is a top view of a halo region formed on the existing alignment film.
Figure 5:
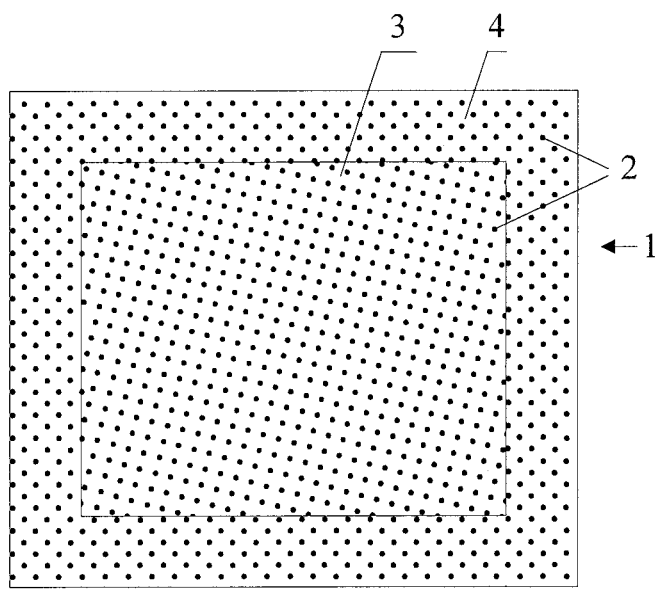
FIG. 5 is a top view of a transfer plate according to one embodiment of the present disclosure.
Figure 6:
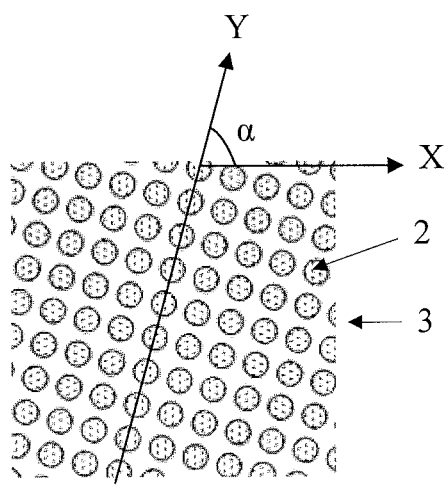
FIG. 6 is a partially schematic view showing a dot array at an active region of the transfer plate according to one embodiment of the present disclosure.
Figure 7:
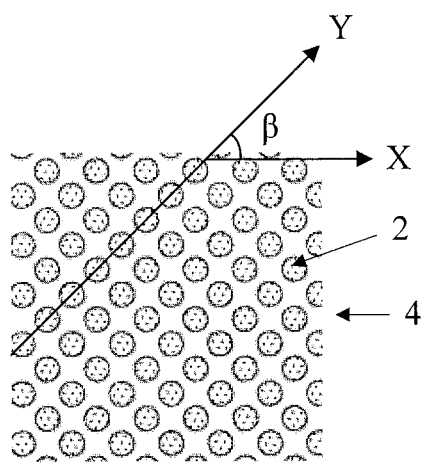
FIG. 7 is a partially schematic view showing a dot array at a non-active region of the transfer plate according to one embodiment of the present disclosure.

Referring to FIG. 5, the present disclosure provides in one embodiment a transfer plate, which includes a base film 1, and a dot array arranged on the base film 1 and consisting of a plurality of dots 2. The base film 1 includes an active region 3 corresponding to a display region and a non-active region 4 surrounding the active region 3. The dot array at the active region 3 is of a first dot angle, and the dot array at the non-active region is of a second dot angle less than the first dot angle. The dot angle represents an angle between an arrangement direction of the dots 2 and a direction of a reference line, i.e., an angle by which the reference line is rotated to the arrangement direction of the dots 2. For ease of description, here, the arrangement direction refers to a direction which is from a left lower corner to a right upper corner and parallel to a straight line connecting two dots 2 adjacent to each other in a direction from a left lower corner to a right upper corner, and the direction of the reference lines is a horizontal direction to the right. As shown in FIG. 6, which is a partially schematic view showing the dot array at the active region 3 of the transfer plate, the dot array includes a plurality of dots 2, where X represents the reference line, Y represents the connection line of the dots of the dot array at the active region 3, a direction indicated by Y represents the arrangement direction of the dots 2, and α represents the first dot angle. As shown in FIG. 7, which is a partially schematic view showing the dot array at the non-active region 4 of the transfer plate, the dot array includes a plurality of dots 2, where X represents the reference line, Y represents the connection line of the dots of the dot array at the non-active region 4, and β represents the second dot angle. In this embodiment, the second dot angle β is less than the first dot angle α.

In this embodiment, the dot angle (e.g., β in FIG. 7) of the dot array at the non-active region 4 of the transfer plate is less than the dot angle (e.g., α in FIG. 6) of the dot array at the active region 3, so it is able to reduce an average height of a halo region at an edge portion of an alignment film when the alignment film is printed by the transfer plate, thereby to perform the subsequent rubbing alignment in a more uniform manner, and prevent the occurrence of abnormal alignment of liquid crystal molecules.

The first dot angle may be within a range from 0° to 90°, and the second dot angle may be within a range from 0° to 75°. Alternatively, in one embodiment, the dot angle of the dot array at the non-active region 4 is smaller than that at the active region, i.e., the first dot angle α is 75°, and the second dot angle β is 45°. In this embodiment, the dot angle of the dot array at the non-active region 4 of the transfer plate is changed relative to the dot angle of the dot array at the active region 3, i.e., from the first dot angle α (75°) to the second dot angle β (45°), so as to print the edge portion of the alignment film at the smaller second dot angle β, thereby to reduce a change in the thickness of the edge portion of the alignment film, and reduce an average height and a width of the halo region at the edge portion of the alignment film.

Alternatively, the dot array at the active region 3 is of a first aperture ratio, and the dot array at the non-active region 4 is of a second aperture ratio greater than the first aperture ratio. The aperture ratio refers to a ratio of an area of dots 2 on the transfer plate to a total area of the transfer plate. The first aperture ratio may be 25-40%, and the second aperture ratio may be 30-45%. Alternatively, the first aperture ratio is 30%, and the second aperture ratio is 35%. In this embodiment, the second aperture ratio is greater than the first aperture ration, so it is able to decrease a gap between the dots 2 at the non-active region 4, thereby to decrease a total amount of the aligning agent at the non-active region 4 and reduce the change in the thickness of the edge portion of the alignment film during the printing due to the insufficient aligning agent.

Alternatively, the dots 2 of the dot array are distributed at an identical density at both the active region 3 and the non-active region 4. In this embodiment, the dots 2 are distributed at an identical density at the active region 3 and at the non-active region 4 of the transfer plate, so as to print the alignment film uniformly.

Alternatively, the dots 2 of the dot array are of an identical shape, e.g., a square shape or a round shape, at both the active region 3 and the non-active region 4. Alternatively, the dots 2 of the dot array at both the active region 3 and the non-active region 4 are each of a round shape. In this embodiment, the dots 2 on the transfer plate are of an identical shape, so as to print the alignment film uniformly.

Alternatively, a cross section of the non-active region 4 is of a minimum width of 300 μm. In this embodiment, the dot angle of the dot array at the non-active region 4 is less than that of the dot array at the active region 3, so as to reduce the height and the width of the halo region of the alignment film at the non-active region 4, thereby to facilitate the rubbing alignment and the manufacture of a narrow-bezel display panel.

According to the embodiments of the present disclosure, the dot angle of the dot array at the non-active region of the transfer plate is less than that of the dot array at the active region, so as to reduce the change in the thickness of the edge portion of the alignment film when the alignment film is printed by the transfer plate and reduce the average height of the halo region at the edge portion of the alignment film, thereby to perform the subsequent rubbing alignment in a more uniform manner, prevent the occurrence of abnormal alignment of the liquid crystal molecules and improve the quality of the display panel. Further, it is able to reduce the width of the halo region of the alignment film at the non-active region, thereby to facilitate the manufacture of the narrow-bezel display panel.

The above are merely the preferred embodiments of the present disclosure. Obviously, a person skilled in the art may make further modifications and improvements without departing from the spirit of the present disclosure, and these modifications and improvements shall also fall within the scope of the present disclosure.

What is claimed is:

1. A transfer plate configured to print an aligning agent onto a liquid crystal cell substrate which includes a liquid crystal display region, the transfer plate comprising:
   a base film; and
   a dot array arranged on the base film and comprising a plurality of dots,
   wherein the base film includes an active region corresponding to the liquid crystal display region and a non-active region surrounding the active region, and
   the dot array at the active region is of a first dot angle, and the dot array at the non-active region is of a second dot angle less than the first dot angle,
   each straight line connecting two adjacent dots in the dot array in the active region refers to a first straight line, each straight line connecting two adjacent dots in the dot array in the non-active region refers to a second straight line, and each first straight line intersects with and is not parallel to each second straight line, and
   wherein the aligning agent, for forming a liquid crystal alignment film in the liquid crystal display region, is adsorbed between the plurality of dots.

2. The transfer plate according to claim 1, wherein the first dot angle is within a range from 0° to 90°, and the second dot angle is within a range from 0° to 75°.

3. The transfer plate according to claim 2, wherein the dot array at the active region is of a first aperture ratio, and the dot array at the non-active region is of a second aperture ratio greater than the first aperture ratio.

4. The transfer plate according to claim 3, wherein the first aperture ratio is 25-40%, and the second aperture ratio is 30-45%.

5. The transfer plate according to claim 4, wherein the first aperture ratio is 30%, and the second aperture ratio is 35%.

6. The transfer plate according to claim 2, wherein the first dot angle is 75°, and the second dot angle is 45°.

7. The transfer plate according to claim 6, wherein the dot array at the active region is of a first aperture ratio, and the dot array at the non-active region is of a second aperture ratio greater than the first aperture ratio.

8. The transfer plate according to claim 7, wherein the first aperture ratio is 25-40%, and the second aperture ratio is 30-45%.

9. The transfer plate according to claim 8, wherein the first aperture ratio is 30%, and the second aperture ratio is 35%.

10. The transfer plate according to claim 1, wherein the dot array at the active region is of a first aperture ratio, and the dot array at the non-active region is of a second aperture ratio greater than the first aperture ratio, wherein the aperture ratio is a ratio of an area of dots on a region to a total area of the region.

11. The transfer plate according to claim 10, wherein the first aperture ratio is 25-40%, and the second aperture ratio is 30-45%.

12. The transfer plate according to claim 11, wherein the first aperture ratio is 30%, and the second aperture ratio is 35%.

13. The transfer plate according to claim 1, wherein the dots of the dot array are distributed at an identical density at both the active region and the non-active region.

14. The transfer plate according to claim 1, wherein the dots of the dot array are of an identical shape at both the active region and the non-active region.

15. The transfer plate according to claim 14, wherein the dots of the dot array at the active region and the non-active region are each of a square or round shape.

16. A transfer plate configured to print an aligning agent onto a liquid crystal cell substrate which includes a liquid crystal display region, the transfer plate comprising:
   a base film; and
   a dot array arranged on the base film and comprising a plurality of dots,
   wherein the base film includes an active region corresponding to the liquid crystal display region and a non-active region surrounding the active region, and
   the dot array at the active region is of a first dot angle, and the dot array at the non-active region is of a second dot angle less than the first dot angle,
   wherein the dot array at the active region is of a first aperture ratio, and the dot array at the non-active region is of a second aperture ratio greater than the first aperture ratio, wherein the aperture ratio is a ratio of an area of dots on a region to a total area of the region, and
   wherein the aligning agent, for forming a liquid crystal alignment film in the liquid crystal display region, is adsorbed between the plurality of dots.

17. The transfer plate according to claim 16, wherein the first dot angle is 75°, and the second dot angle is 45°.

18. The transfer plate according to claim 16, wherein the first aperture ratio is 30%, and the second aperture ratio is 35%.

19. The transfer plate according to claim 16, wherein the dots of the dot array are distributed at an identical density at both the active region and the non-active region.

20. The transfer plate according to claim 16, wherein the dots of the dot array are of an identical shape at both the active region and the non-active region.

* * * * *